(12) United States Patent
Iizuka

(10) Patent No.: US 9,074,926 B2
(45) Date of Patent: Jul. 7, 2015

(54) ELECTRONIC BALANCE WITH WINDPROOF CASE AND ELECTRICALLY CONDUCTIVE STRUCTURE

(71) Applicant: SHIMADZU CORPORATION, Kyoto-shi, Kyoto (JP)

(72) Inventor: Atsushi Iizuka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 227 days.

(21) Appl. No.: 13/692,264

(22) Filed: Dec. 3, 2012

(65) Prior Publication Data

US 2014/0151134 A1  Jun. 5, 2014

(51) Int. Cl.
*G01G 21/28* (2006.01)

(52) U.S. Cl.
CPC .................................... *G01G 21/286* (2013.01)

(58) Field of Classification Search
CPC ........................................ G01G 21/28–21/286
USPC ............ 177/25.12, 25.13, 180, 181, 238, 244
See application file for complete search history.

(56) References Cited

U.S. PATENT DOCUMENTS

| | | | | |
|---|---|---|---|---|
| 4,821,821 A | * | 4/1989 | Kelley | 177/181 |
| 4,884,645 A | * | 12/1989 | Knothe et al. | 177/180 |
| 6,515,238 B1 | * | 2/2003 | Martens et al. | 177/180 |
| 6,566,614 B1 | * | 5/2003 | Fluckiger et al. | 177/180 |
| 7,323,645 B2 | * | 1/2008 | Nufer et al. | 177/180 |
| 2010/0000802 A1 | * | 1/2010 | Izumo et al. | 177/181 |
| 2014/0014416 A1 | * | 1/2014 | Feldotte et al. | 177/181 |

FOREIGN PATENT DOCUMENTS

JP        2001-099699 A       4/2001

* cited by examiner

*Primary Examiner* — Peter Macchiarolo
*Assistant Examiner* — Natalie Huls
(74) *Attorney, Agent, or Firm* — Sughrue Mion, PLLC

(57) ABSTRACT

Brackets and are disposed on the back surface of an upper case on which a pair of molded members and constituting a cylindrical structure forming a rear wall of a windproof case are erected. At one end of each of the brackets, the bracket is electrically connected to the molded member and the bracket is electrically connected to the molded member by screws of the upper case, and the brackets are electrically connected to a lower case by screws. Further, a metal plate on the upper case is electrically connected via a metal member fixed to the cylindrical structure.

4 Claims, 5 Drawing Sheets

(B)

(A)

(A)

(B)

(A)

(B)

(A)

(B)

ELECTRONIC BALANCE WITH WINDPROOF CASE AND ELECTRICALLY CONDUCTIVE STRUCTURE

TECHNICAL FIELD

The present invention relates to an electronic balance with a windproof case and more particularly to an inexpensive, lightweight (reading precision of 1 mg or less) electronic balance with a windproof case.

BACKGROUND ART

In a conventional high-precision, high-resolution (reading precision of 1 mg or less) electronic balance, external air currents have a substantial effect on the weighing precision, so a method of enclosing the vicinity of the scale pan with a windproof case is employed in order to eliminate such causes of error. FIG. 7 is a top view (A) and a side view (B) showing an example of the external appearance of an electronic balance with a windproof case. As shown in the drawings, in an electronic balance 101, a windproof case 105 is disposed on a main body case 104 comprising a lower case 102 which typically houses electrical circuits for measuring the weights of samples and a display part for displaying weighed values and an upper case 103 which is mounted on top of the lower case 102 (see Patent Literature 1, for example).

The windproof case 105 comprises a pair of L-shaped frames 106A and 106B erected on the upper case 103, a tube structure 107 erected on the rear part, a frame 109 comprising a four-sided frame which makes contact with the upper parts of the L-shaped frames 106A and 106B and is fastened to the upper part of the tube structure 107 with screws, a front glass 110 disposed on the front surface of the frame 109, an upper slide glass 111 which can be moved forward or backward when inserting or removing an object to be weighed, a right slide glass 112, and a left slide glass 113 so as to enclose a scale pan 114 in an airtight state.

Patent literature 1) Japanese Unexamined Patent Application 2001-99699

SUMMARY OF THE INVENTION

In the electronic balance described above, many aluminum alloys have conventionally been used for the material of the main body case 104, but resins have recently been used for the material of the upper case 103 due to increases in the need for cost reductions and lighter weight. When the entire material of the main body case 104 is a metal material such as an aluminum alloy, the effects of electromagnetic waves or static electricity from the outside on the weighing precision are negligibly small since the main body case 104 and the tube structure are electrically connected to one another, but when the upper case 103 is made of a resin, there is the problem that the weighing precision is substantially affected by the infiltration of electromagnetic waves or the generation of static electricity from the outside.

In addition, when the upper case 103 is made of a resin, it is susceptible to deformation due to change over the years or the effects of environmental conditions, and when deformation occurs in the upper case 103 in the vicinity of the lower part of the tube structure 107 shown in FIG. 7, the tube structure 107 may slope backwards. When the tube structure 107 slopes backwards, the front of the frame 109 rises, and a gap is generated between the upper part of the front glass 110 and the frame 109, which breaks the seal of the windproof case. This affects the weighing precision and leads to the problem that bumps develop in the front glass. In addition, forming the case with a resin also leads to the problem of insufficient rigidity.

The electronic balance of the present invention is an electronic balance in which a metal lower case and a resin upper case are attached, the electronic balance comprising a load detection part for detecting the load of an object to be weighed and a windproof case provided on the load detection part and a main body case, wherein the object to be weighed is placed on a scale pan inside the windproof case so as to measure the weight thereof, and the electronic balance is equipped with a metal tube structure constituting the rear wall of the windproof case and an electrically conductive structure for electrically connecting the tube structure and the lower case.

Further, the electronic balance is equipped with a metal plate disposed on the upper surface of the upper case in the windproof case and a metal member for connecting the metal plate and the tube structure.

Further, the electrically conductive structure has a vertical reinforcing site for preventing the deformation of the upper case.

This electronic balance is equipped with an electrically conductive structure for electrically connecting the lower case and the tube structure and a metal member for electrically connecting the metal plate on the upper surface of the upper case in the windproof case and the tube structure, so electromagnetic waves and static electricity from the outside pass through the outer shell of the main body case of the electronic balance from the tube structure via the electrically conductive structure and the metal member, which eliminates interference with internal electrical circuits. Moreover, since the electrically conductive structure is equipped with a vertical reinforcing site for preventing the deformation of the upper case, the rising of the front of the top part of the windproof case is prevented. As a result, inadequacies in strength are prevented, and an inexpensive, lightweight, high-precision, windproof electronic balance can be obtained.

EXEMPLARY EMBODIMENTS OF THE INVENTION

Figure 1:
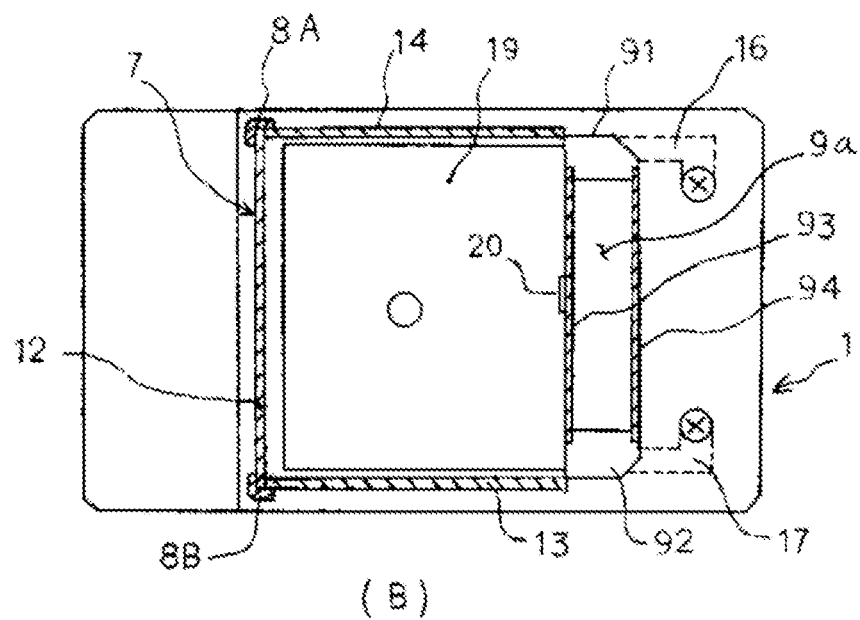
FIG. 1 is a central cross-sectional view (A) and a cross-sectional view (B) along A-A showing the configuration of the case of an electronic balance according to the present invention.
Figure 1:
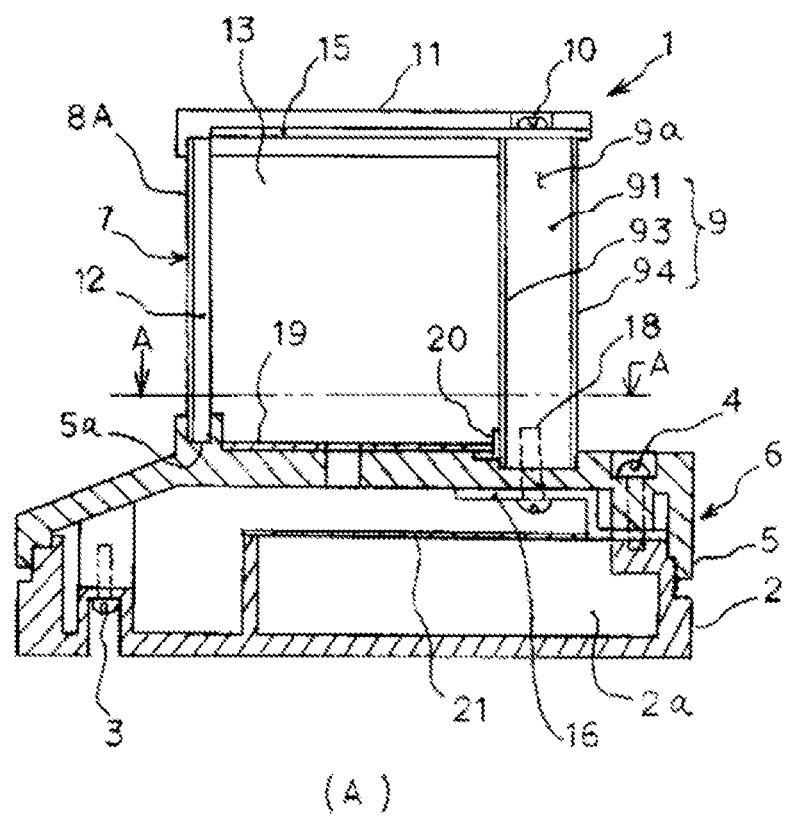
Figure 2:
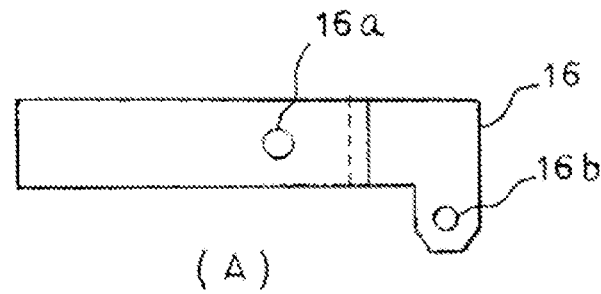
FIG. 2 is a top view (A) and a right side view (B) of the brackets of an embodiment.
Figure 2:
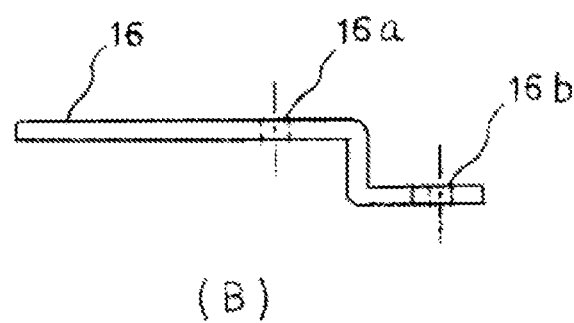
Figure 3:
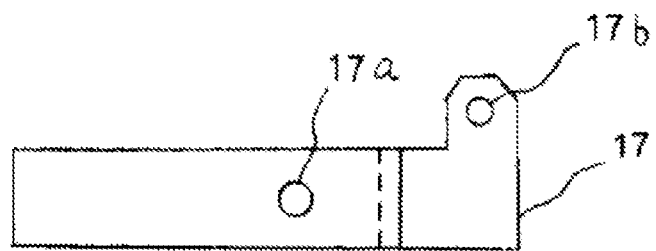
FIG. 3 is a top view (A) and a right side view (B) of the brackets of an embodiment.
Figure 3:
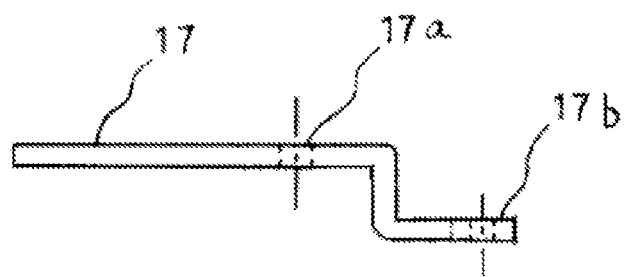

Embodiments of the electronic balance of the present invention will be described hereinafter with reference to the drawings. FIG. 1 is a central cross-sectional view (A) and a cross-sectional view (B) along A-A in the forward/backward direction of a case of an electronic balance of the present invention. FIGS. 2 and 3 are respectively top views (A) and right side views (B) of brackets 16 and 17 of an embodiment. A case 1 comprises (i) a main body case 6 comprising (a) a metal lower case 2 forming a housing chamber 2a which houses a load detection part for detecting the load of an object to be weighed and electrical circuits for converting electrical signals detected from the load detection part into weight value data of the object to be weighed and (b) a resin upper case 5 which is mounted on top of the lower case 2 and is connected with two screws 3 and two screws 4 and (ii) a windproof case 7 disposed on the upper surface of the main body case 6.

The windproof case 7 comprises a pair of L-shaped frames 8A and 8B erected on both ends of a groove 5a provided on the upper case 5, a tube structure 9 forming a housing chamber 9a enclosed by a pair of molded members 91 and 92 and metal plates 93 and 94 erected on the rear, and a frame 11 consisting of a four-sided frame which makes contact with the head parts of the L-shaped frames 8A and 8B and is fastened to the head parts of the molded members 91 and 92 with screws 10. A front glass 12 is fitted into the frame, and a right slide glass 13, a left slide glass 14, and an upper slide glass 15 are fitted so that they can move forward and backward.

Brackets 16 and 17 serving as a pair of electrically conductive structures made of metal as shown in FIGS. 2 and 3 are disposed on the rear surface of the upper case 5. Small holes 16a and 16b are opened in the bracket 16, and small holes 17a and 17b are opened in the bracket 17. As shown in FIG. 1, the bracket 16 is linked to the molded member 91 via the upper case 5 by a screw 18 passing through the small hole 16a, and the rear side of the bracket makes contact with the lower case 2 and is integrally linked to the upper case 5 by a screw 4. As a result, the tube structure 9 is electrically connected to the lower case 2. Similarly, the molded member 92 is electrically connected to the lower case 2 by the bracket 17.

In addition, a metal plate 19 attached to the upper surface of the upper case 5 in the windproof case 7 makes contact with a metal member 20 fixed to the metal plate 93, and the metal plate 19 and the lower case 2 are electrically connected to one another.

A metal plate 21 is mounted on the upper surface of the housing chamber 2a of the lower case 2 in the electrically conductive state so that the housing chamber 2a is electrically shielded. The housing chamber 9a in the tube structure 9 houses a substrate for performing measurements, but since it is electrically connected to the housing chamber 2a, radio wave noise from the outside passes through the tube structure 9 and the lower case 2 so that interference with the internal circuits is prevented. Further, since the metal plate 19 is also electrically connected to the lower case 2, the effects of static electricity induced in the metal plate 19 on weighed values are prevented. A power supply circuit or an interface circuit for interfacing with an external device may also be disposed in the housing chamber 9a.

Figure 4:
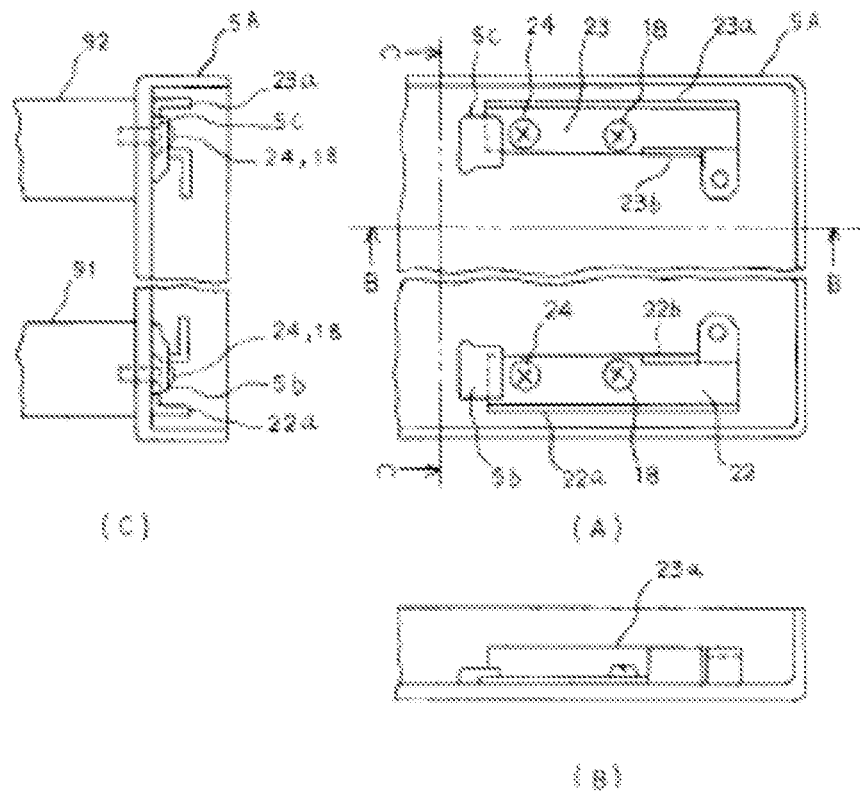
FIG. 4 is a rear view (A), a cross-sectional view (B) along B-B, and a cross-sectional view (C) along C-C of a cover according to another embodiment.

Another embodiment of the upper case 5 used in the main body case 6 will be described with reference to FIGS. 4, 5, and 6. FIG. 4 is a rear view (A), a cross-sectional view (B) along B-B, and a cross-sectional view (C) along C-C of an upper case 5A according to another embodiment, and FIGS. 5 and 6 are respectively top views (A) and right side views (B) of brackets 22 and 23 of the embodiment.

The brackets 22 and 23 are configured by adding vertical reinforcing sites 22a and 22b and vertical reinforcing sites 23a and 23b, which are perpendicular to the rear surface of the upper case 5A, to the brackets 16 and 17 so as to improve the strength for preventing bending in the direction perpendicular to the load due to the deformation of the windproof case 7 or the upper case 5A. In the upper case 5A, protrusions 5b and 5c forming concavities into which one end of each of the brackets 22 and 23 is fitted are provided at left-right symmetrical positions.

When the molded member 91 is fixed to the upper case 5A by a screw 18 in a state in which one end of the bracket 22 is inserted into the concavity of the protrusion 5b of the upper case 5A, the displacement in the vertical direction of the corresponding site of the upper case 5A on the protrusion 5b with respect to the fixing site of the molded member 91 site is suppressed. In addition, the molded member 92 is fixed via the upper case 5A by a screw 18 in a state in which one end of the bracket 23 is inserted into the concavity of the protrusion 5c. As a result, the vicinity of the molded members 91 and 92 of the upper case 5A is reinforced by the vertical reinforcing sites 22a and 22b of the bracket 22 and the vertical reinforcing sites 23a and 23b of the bracket 23 so that factors contributing to the sloping of the molded members 91 and 92 are eliminated.

Figure 5:
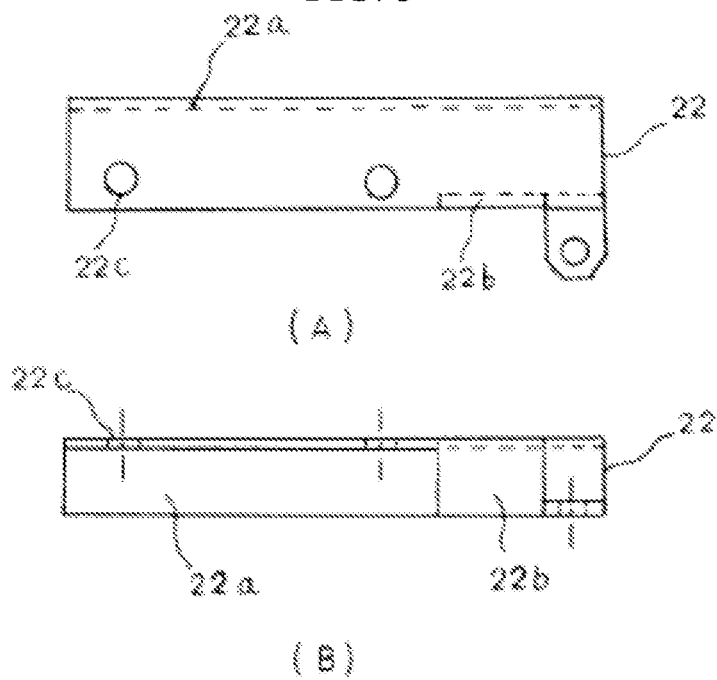
FIG. 5 is a top view (A) and a right side view (B) of the brackets of an embodiment.
Figure 6:
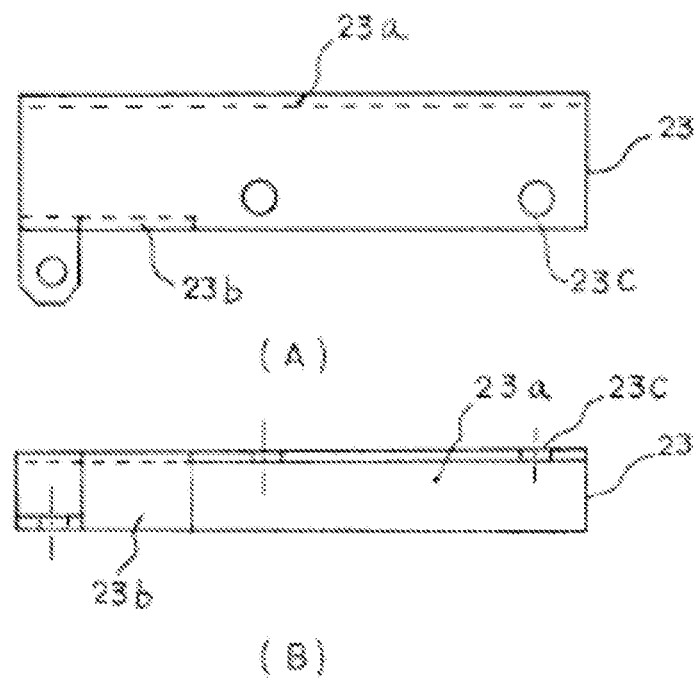
FIG. 6 is a top view (A) and a right side view (B) of the brackets of an embodiment.
Figure 7:
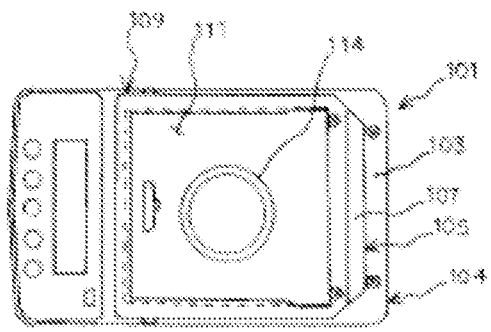
FIG. 7 is a top view (A) and a right side view (B) of a conventional electronic balance with a windproof case.
Figure 7:
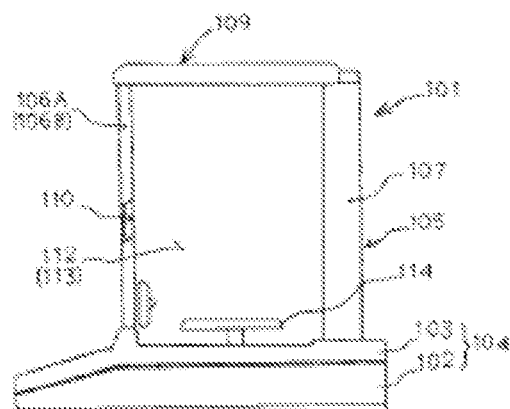

The present invention is not limited to the embodiments described above, and as a fixing method for the brackets 22 and 23, for example, small holes 22c and 23c may be opened, as shown in FIGS. 5 and 6, or the brackets may be screwed into the upper case 5A using screws 24, as shown in FIG. 4. In addition, one end of the bracket 22 may be embedded inside the upper case in advance.

EXPLANATION OF REFERENCES 1 case
2 lower case
2a housing chamber
3 screw
4 screw
5 upper case
5A upper case
5a groove
5b protrusion
5c protrusion
6 main body case
7 windproof case
8A L-shaped frame
8B L-shaped frame
9 tube structure
9a housing chamber
10 screw
11 frame
12 front glass
13 right slide glass
14 left slide glass
15 upper slide glass
16 bracket
16a small hole
16b small hole
17 bracket
17a small hole
17b small hole
18 screw
19 metal plate
20 metal member
21 metal plate
22 bracket
22a vertical reinforcing site
22b vertical reinforcing site
22c small hole
23 bracket
23a vertical reinforcing site
23b vertical reinforcing site 23c small hole
24 screw
91 molded member
92 molded member
93 metal plate
94 metal plate
101 electronic balance
102 lower case
103 upper case
104 main body case
105 windproof case
106A L-shaped frame
106B L-shaped frame
107 tube structure
109 frame
110 front glass
111 upper slide glass
112 right slide glass
113 left slide glass
114 scale pan

What is claimed is:

1. An electronic balance in which a metal lower case and a resin upper case are attached, said electronic balance comprising
a load detection part for detecting the load of an object to be weighed and
a windproof case provided on a main body case,
wherein the object to be weighed is placed on a scale pan inside the windproof case so as to measure the weight thereof, and said electronic balance is equipped with a metal tube structure constituting a rear wall of said windproof case and an electrically conductive structure disposed under the tube structure for electrically connecting said tube structure and said lower case, and
wherein the tube structure houses a substrate for performing measurements.

2. An electronic balance according to claim 1 which is equipped with a metal plate disposed on the upper surface of the upper case in said windproof case and a metal member for connecting said metal plate and said tube structure.

3. An electronic balance according to claim 2, wherein said electrically conductive structure includes a reinforcing member extending in an upper-lower direction for preventing the deformation of the upper case.

4. An electronic balance according to claim 1, wherein said electrically conductive structure includes a reinforcing member extending in an upper-lower direction for preventing the deformation of the upper case.

* * * * *